US 9,629,783 B2

(12) United States Patent
Kim et al.

(10) Patent No.: US 9,629,783 B2
(45) Date of Patent: Apr. 25, 2017

(54) MULTIFUNCTIONAL MILK BOTTLE HOLDER

(76) Inventors: Donggyu Kim, Busan (KR); Chigeon Choi, Busan (KR)

(*) Notice: Subject to any disclaimer, the term of this patent is extended or adjusted under 35 U.S.C. 154(b) by 192 days.

(21) Appl. No.: 14/408,207

(22) PCT Filed: Jun. 14, 2012

(86) PCT No.: PCT/KR2012/004679
§ 371 (c)(1),
(2), (4) Date: Dec. 15, 2014

(87) PCT Pub. No.: WO2013/187540
PCT Pub. Date: Dec. 19, 2013

(65) Prior Publication Data
US 2015/0174012 A1   Jun. 25, 2015

(51) Int. Cl.
*A47J 36/24* (2006.01)
*A61J 9/06* (2006.01)
(Continued)

(52) U.S. Cl.
CPC .............. *A61J 9/06* (2013.01); *A47J 36/2433* (2013.01); *A61J 9/02* (2013.01); *A61J 9/0646* (2015.05); *A61J 9/08* (2013.01); *A61J 9/0615* (2015.05); *A61J 2200/72* (2013.01); *A61J 2205/20* (2013.01); *A61J 2205/70* (2013.01)

(58) Field of Classification Search
CPC .... A47J 36/24; A47J 36/2433; A47J 36/2438; A61J 9/00; A61J 9/02; A61J 9/06; A61J 9/0615; A61J 9/0646; A61J 9/08
USPC ................... 99/453–483; 219/201, 385, 389; 366/144–149, 208, 209
See application file for complete search history.

(56) References Cited

U.S. PATENT DOCUMENTS

| | | | |
|---|---|---|---|
| 2,700,097 A * | 1/1955 | Morey | A47J 36/2433 366/145 |
| 4,678,093 A | 7/1987 | Allen | |
| 8,960,992 B2 * | 2/2015 | Jong | A47J 36/2438 366/146 |

FOREIGN PATENT DOCUMENTS

| | | | |
|---|---|---|---|
| JP | 2000065708 A | 3/2000 | |
| JP | 2007312932 A | 12/2007 | |

(Continued)

OTHER PUBLICATIONS

Kim, International Search Report, PCT/KR2012/004679, Jan. 23, 2013, 2 pgs.

*Primary Examiner* — Bryon Gehman
(74) *Attorney, Agent, or Firm* — Morgan, Lewis & Bockius LLP

(57) ABSTRACT

The present invention relates to a multifunctional milk bottle holder, and more particularly, to a multifunctional milk bottle holder which: is capable of providing information related to whether bottle-feeding is occurring using the inclination of the holder for feeding, wherein power is automatically turned on when a milk bottle containing liquid milk is placed in the holder for feeding; is capable of providing information related to the temperature of the liquid milk while maintaining the temperature of the liquid milk for a predetermined period of time; and has excellent price competitiveness due to reduced manufacturing costs. Also, the holder is capable of developing the senses of vision and hearing through the operation of a mobile which rotates in the holder and of a sound source generation unit, thereby ensuring ease of use.

3 Claims, 4 Drawing Sheets

(51) Int. Cl.
*A61J 9/02* (2006.01)
*A61J 9/08* (2006.01)

(56) References Cited

FOREIGN PATENT DOCUMENTS

KR    2019950028584 U    10/1995
KR         101095187 B1    12/2011

* cited by examiner

MULTIFUNCTIONAL MILK BOTTLE HOLDER

TECHNICAL FIELD

The present invention relates to a multifunctional milk bottle holder and, more particularly, to a multifunctional milk bottle holder which can provide information on bottle-feeding based on the inclination of the holder for milk feeding as the power is automatically turned on when a milk bottle containing liquid milk is placed in the holder for milk feeding, can provide information on the temperature of the liquid milk while maintaining the temperature of the liquid milk for a predetermined period of time, and has excellent price competitiveness due to reduced manufacturing costs. Moreover, the multifunctional milk bottle holder allows an infant to develop the senses of vision and hearing through the operation of a mobile which rotates in the holder and a sound source generator, thereby ensuring ease of use.

BACKGROUND ART

In general, a milk bottle holder is provided with a separate melody device configured to allow an infant to listen to classical music such as Beethoven during milk feeding so as to have emotional stability in the unconscious world, and its technical configurations are generally classified into fifteen types.

The first type is a milk bottle holder comprising a separate melody device provided therein and an on/off switch for switching the melody device (hereinafter referred to as "first prior art"), the second type is a device attached to the bottom of a milk bottle to output voice or emit light according to the operation of a switch (hereinafter referred to as "second prior art"), and the third type is a device provided with a sensor that operates in response to the inclination of a milk bottle so as to bring an infant's brainwave into an alpha state during milk feeding, thus helping the growth of brain (hereinafter referred to as "third prior art"). The fourth type is a device for making a heartbeat sound (hereinafter referred to as "fourth prior art"), and the fifth type is a device for detecting the temperature of a milk bottle and displaying the temperature in digital numbers (hereinafter referred to as "fifth prior art"). The sixth type is a milk bottle holder provided with a thermometer (hereinafter referred to as "sixth prior art"), and the seventh type is a device for generating a melody by operating an actuator provided in a memory circuit board by means of suction pressure (hereinafter referred to as "seventh prior art"). The eighty type is a device for generating a melody by means of an input button and an input circuit electrically connected to the input button and generating an input signal (hereinafter referred to as "eighth prior art"), and the ninth type is a device for storing a parent's voice by means of a microphone and generating the stored voice or melody when an infant tilts a holder at a predetermined angle (hereinafter referred to as "ninth prior art"). The tenth type is a device provided with a vacuum port to maintain the temperature of milk (hereinafter referred to as "tenth prior art"). The eleventh type is a device for moving articles hanging on a mobile by means of a string's vibration when an infant is sucking a milk bottle (hereinafter referred to as "eleventh prior art"), and the twelfth type is a mobile device combined with a holder, into which an infant milk bottle is put, to attract an infant's attention (hereinafter referred to as "twelfth prior art"), and the thirteenth type is a mobile device constructed with poles that form a triangular pyramid shape (hereinafter referred to as "thirteenth prior art"). The fourteenth type is a mobile device for amusement which uses a flexible pipe as a framework (hereinafter referred to as "fourteenth prior art"), and finally, the fifteenth type is a clockwork-driven milk bottle holder in which a mobile is rotated and discolored by an actuator of a clockwork and a xylophone sound is produced (hereinafter referred to as "fifteenth prior art").]

However, according to the above-mentioned milk bottle of the first prior art, the music is played from the melody device only when the on/off switch is operated by an infant's mother or nanny (hereinafter referred to as an "operator"), resulting in inconvenience in use. Moreover, there is a drawback in that the on/off switch cannot be operated by the infant, and it is inconvenient to replace its battery.

Moreover, the second prior art also has the problem in that it is very inconvenient to listen to the melody without the help of an operator, which is the same problem as the first prior art. Furthermore, there is a drawback in that the battery should be replaced. In addition, the third prior art is an advanced technology, compared to the above-mentioned prior arts, in which the generation of light and melody is provided by the sensor that operates in response to the inclination, but it is inconvenient to have an expensive sensor and there is no practical use.

Meanwhile, in order to solve these problems, the present applicant has registered a patent for a clockwork-driven milk bottle holder (Korean Patent No.: 10-1095187).

The registered patent is configured such that only when an infant tilts the milk bottle holder, a rotary plate is rotated by winding and unwinding operations, a xylophone sound is produced, and a mobile is discolored by the temperature of milk.

However, according to the registered patent, the music is not automatically generated and the mobile is not rotated when an infant is fed with milk by itself without the help of an operator to wind the clockwork, and the rotation of the mobile and the generation of the xylophone sound can be provided only when the operator winds the clockwork.

Moreover, the milk bottle holder according to the registered patent uses a small battery, and thus the battery should be frequently replaced. The clockwork should be wound for the operation, which is very inconvenient. Furthermore, the mobile device configured to help the development of an infant's vision occupies a lot of space, which reduces the practical use. In addition, when the temperature of liquid milk is below a predetermined temperature at which an infant cannot be fed with milk, the temperature is displayed by a digital tool using a thermometer, and thus there is no means to display the temperature in colors on the milk bottle holder and generate a buzzer sound. Additionally, the structure for maintaining the temperature for a predetermined period of time is achieved by complex assembly, which also reduces the practical use.

Also, there is no reed switch that is automatically operated even without an additional operation, and there is also no device that is automatically operated by the weight of liquid milk as a plan to provide the mobile function, the discoloring function, and the function of generating various types of melodies at the same time without the use of a sensor that is operated by a small battery or by clockwork winding, resulting in inconvenience in use.

DISCLOSURE

Technical Problem

The present invention has been made to solve the above-mentioned problems, and an object of the present invention is to provide a multifunctional milk bottle holder which helps an infant's emotional stability and brain development when the infant is fed with milk contained in a milk bottle without the help of a guardian and also ensures convenience in use to the guardian by means of a reed switch.

Another object of the present invention is to provide a multifunctional milk bottle holder which is formed of a nonconductor and a soft resin having antibacterial properties so as to prevent safety accidents caused by electricity and to reuse the used milk bottle holder after sterilization, from which an operating case provided with an actuator and an electronic circuit is separated, resulting in excellent economic feasibility and practical use. Moreover, the multifunctional milk bottle holder of the present invention prevents the problems such as waste of resources, environmental contamination, etc. that may be caused by the use of disposable bottles.

Still another object of the present invention is to provide a multifunctional milk bottle holder which helps an infant's emotional stability by the use of a card storing a symphony and also helps the infant's cognitive ability by allowing a picture to be spread in a visual aspect when a mobile coated with sunscreen is rotated in the milk bottle holder.

Yet another object of the present invention is to provide a multifunctional milk bottle holder in which the inner surface is formed of tin so as to maintain the temperature of milk contained in a milk bottom for a predetermined period of time and when the temperature of milk is below or above a predetermined temperature at which an infant cannot be fed with milk, a predetermined area of the outer surface of the milk bottle holder is discolored and a buzzer sound is generated, thus helping the infant's health.

Still yet another object of the present invention is to provide a multifunctional milk bottle holder which stops the generation of a melody in a crowded public place so as not to violate other people's privacy and uses a virus piezoelectric element that is operated by the temperature of liquid milk, instead of a small battery or clockwork, which makes it possible to use the milk bottle holder as a toy together with economic benefits.

Technical Solution

To achieve the above objects, the present invention provides a multifunctional milk bottle holder comprising a body case having a space formed therein and supporting a milk bottle and a motor driving means provided at the bottom of the body case and including a shaft which receives power of a motor and rotates, a contact switch which projects from the bottom of the body case to be rechargeable, and a sound source generator which is operated at the same time when a rotary plate of the holder is rotated by the shaft to generate stored music such as a symphony by means of a central processing unit provided on an electronic circuit board, wherein the rotary plate is connected to the shaft via a power transmission gear so as to receive the power of the shaft and rotate with respect to a hinge, and wherein the operating case comprises a reed switch, which is formed in a V shape and includes barrier walls formed on both sides thereof, a mercury placed therein, and first, second, and third reed switch grooves which restrict the power unit such that the mercury provided in the operating case is separated from the first, second, and third reed switch grooves by the inclination of the body case by its self weight to turn off the power unit.

A mobile case provided with a groove for accommodating the milk bottle is preferably formed in the upper center of the body case, the mobile case being formed with a dual pipe structure including inner and outer pipes, wherein a mobile is installed in a sidewall space between the inner and outer pipes and a rotary plate connected to the shaft is provided on a bottom space between the inner and outer pipes.

A discoloration case inserted into the groove of the mobile case and includes a doze test paper that adheres to the outer surface of the milk bottle and is discolored by a change in temperature of the milk bottle is preferably provided.

Advantageous Effects

The multifunctional milk bottle holder according to the present invention is not operated by a small battery or a device such as winding clockwork but uses a virus piezoelectric element operated only by the weight of liquid milk. As a result, there are no malfunctions, and the power consumption is very low, thus providing practical use and economic feasibility.

Moreover, the multifunctional milk bottle holder containing liquid milk suitable for an infant to be fed is operated only when the infant tilts the holder for milk feeding, and thus the feeding of milk to the infant can be stably managed even without a guardian's attendant action.

Furthermore, the temperature of liquid milk is maintained by the tin coated on the interior of the multifunctional milk bottle holder and is displayed in colors when it is below or above a predetermined temperature and, at the same time, a buzzer sound is generated, thus providing convenience in use.

In addition, the multifunctional milk bottle holder forcibly stops the mobile rotation and the melody function by means of an on/off switch in a crowded public place, thus keeping other people's privacy.

Additionally, the multifunctional milk bottle holder, from which the operating case is separated, can be reused after sterilization, thus preventing the problems such as waste of resources, environmental contamination, etc.

Also, a picture coated on the mobile is spread and rotated only when an infant is fed with milk without a guardian's attendant action, and the melody functions is simultaneously operated by a replaceable music card, thus providing amusement.

BEST MODE FOR CARRYING OUT THE INVENTION

Figure 1:
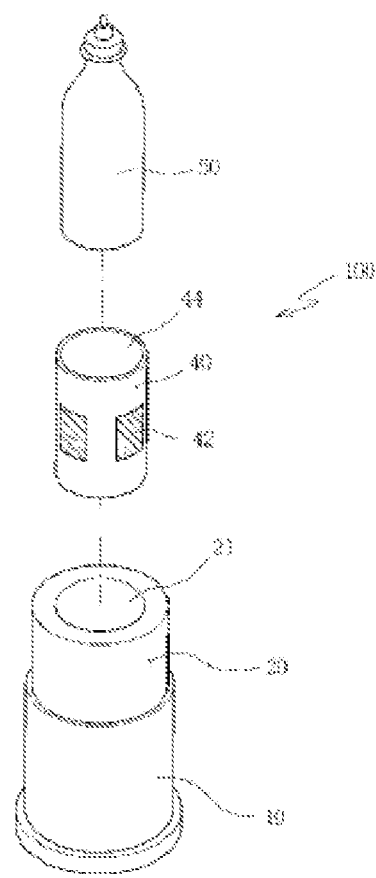
FIG. 1 is a perspective view of a multifunctional milk bottle holder according to the present invention.

A multifunctional milk bottle holder according to the present invention comprises: a body case 10 having a space 12 formed therein and supporting a milk bottle 50; a mobile case 20 provided with a groove 21 formed in the upper center of the body case 10 to accommodate the milk bottle 50 and formed with a dual pipe structure including inner and outer pipes 22 and 24, wherein a mobile 30 is installed in a sidewall space 26 between the inner and outer pipes 22 and 24 and a rotary plate 32 is provided on a bottom space 28 between the inner and outer pipes 22 and 24; a discoloration case 40 inserted into the groove 21 of the mobile case 20 and including a doze test paper 42 which adheres to the outer surface of the milk bottle and is discolored by a change in temperature of the milk bottle 50; and an operating 110 case located at the inner bottom of the body case 10, wherein the operating case 110 comprises a motor 60 connected to the rotary plate 32 via a shaft 80 to rotate the rotary plate 32, a power unit 72 for providing rotary power to the motor 60, and a reed switch 70 which is formed in a V or U shape with closed inlet and outlet and comprises a first reed switch groove 81 and a second reed switch groove 82 which are formed on both sides thereof, a third reed switch groove 83 provided at the bottom thereof, and a mercury 76 located therein, the reed switch 70 controlling an on/off operation of the power unit 72 by a correlation between the mercury 76 and the reed switch grooves 81, 82 and 83.

MODE FOR INVENTION

Hereinafter, embodiments of the present invention will be described with reference to the accompanying drawings. In the following detailed description, representative embodiments of the present invention will now be described to solve the above-described technical problems. Other embodiments that can be provided in the present invention will be replaced with the description in the configuration of the present invention.

Figure 2:
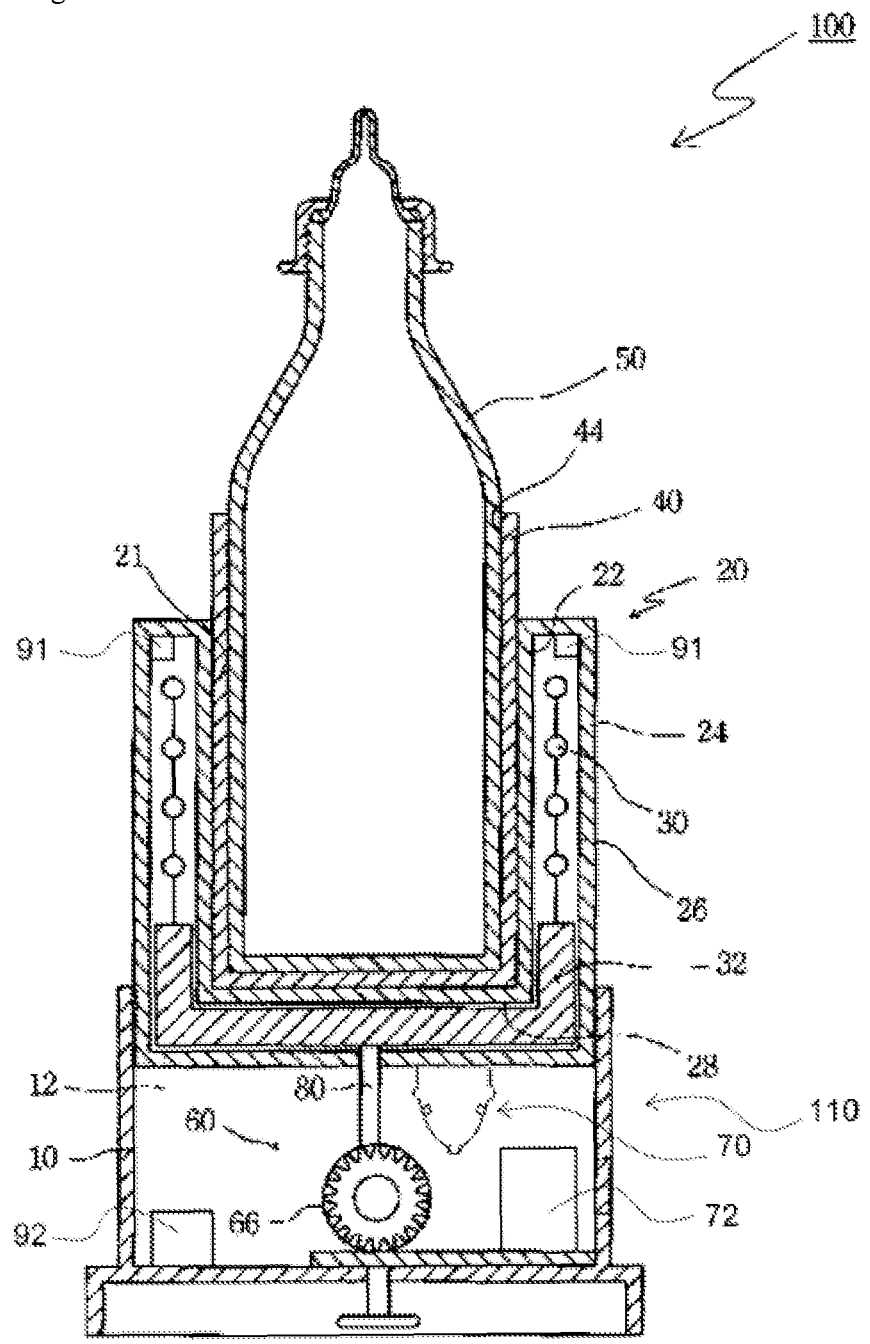
FIG. 2 is a vertical cross-sectional view of FIG. 1.

FIG. 1 is a three-dimensional view showing the configuration of a multifunctional milk bottle holder according to the present invention, and FIG. 2 is a cross-sectional view showing the multifunctional milk bottle holder shown in FIG. 1.

As shown in FIGS. 1 and 2, the multifunctional milk bottle holder 100 comprises a body case 10, a mobile case 20, a discoloration case 40, and a milk bottle 50.

The body case 10 has a cylindrical shape in which the upper end is opened and a space 12 is formed therein. A motor 60 for generating power to rotate a mobile 30 installed in the mobile case 20 and generating various types of melodies is installed in an operating case 110 separated from and connected to the body case 10. Moreover, an electric circuit (not shown) and a sound source generator 92 are installed in the space 12, and a fluorescent lamp 91 for generating ultraviolet rays in a picture section coated with sunscreen to spread the picture and sterilize liquid milk is installed in the mobile case 20. A driving means of the motor 60 will be described in detail later.

The mobile case 20 is inserted into the upper side of the body case 10 and formed with a dual pipe structure including inner and outer pipes 22 and 24 such that the mobile 30 having various shapes is inserted into a sidewall space 26 between the inner and outer pipes 22 and 24. Moreover, a rotary plate 32 which is rotated by the operation of the motor 60 is installed on a bottom space 28 between the inner and outer pipes 22 and 24 and the mobile 30 is installed on the rotary plate 32 such that the mobile 30 receives power from the motor 60 and rotates when the rotary plate 32 is rotated by the operation of the motor 60.

The connection structure between the rotary plate 32 and the motor 60 is configured in a manner that one end of a shaft 80 that constitutes the motor 60 is connected to the motor 60 and the other end of the shaft 80 is connected to the lower end of the rotary plate 32 such that the rotary power of the motor 60 is transmitted to the rotary plate 32, which will be described in more detail below.

A groove 21 is recessed in the center of the mobile case 20, and the discoloration case 40 is inserted into the groove 21.

A doze test paper 42 is coated on the surface of the discoloration case 40 to be discolored by the temperature of milk contained in the milk bottle 50 such that a parent can easily check the temperature of milk. The discoloration case 40 is formed of a transparent material and adheres to the outer surface of the milk bottle, and the doze test paper 42 preferably has various patterns such that an infant has an interest in the milk bottle holder.

A groove is also recessed in the center of the discoloration case 40, and the milk bottle 50 is inserted into the groove.

Meanwhile, the motor 60 for driving the mobile, the electronic circuit (not shown) for the sound source generation, and a reed switch 70 are installed in the inner space of the operating case 110 separated from and connected to the body case 10.

An end of the shaft 80 is connected to the motor 60 and the other end of the shaft 80 is connected to the rotary plate 32, which is installed on the bottom space 28 between the inner and outer pipes 22 and 24 of the mobile case 20, such that the rotary power of the motor 60 is transmitted to the rotary plate 32. As a result, the mobile 30 installed on the rotary plate 32 receives the rotary power of the shaft 80 and rotates in the sidewall space 26 between the inner and outer pipes 22 and 24.

Meanwhile, a mercury 76 having a predetermined weight is provided in a space of the reed switch 70, which is formed in a V shape with closed inlet and outlet, such that when the mercury 76 is inclined, that is, when the connected body case 10 is inclined, where the body case 10 stands vertically or lies horizontally without restricting a power unit 72, the mercury 76 is brought into contact with reed switch grooves 81, 82 and 83, respectively, thus restricting the power unit 72.

Specifically, in the space of the reed switch grooves 81, 82 and 83 of the interior of the reed switch 70 formed in a V shape with closed inlet and outlet and barrier walls 1 and 2, the mercury 76 is brought into contact with the reed switch groove 83 when the body case 10 stands vertically as shown in FIG. 2.

Figure 3A:
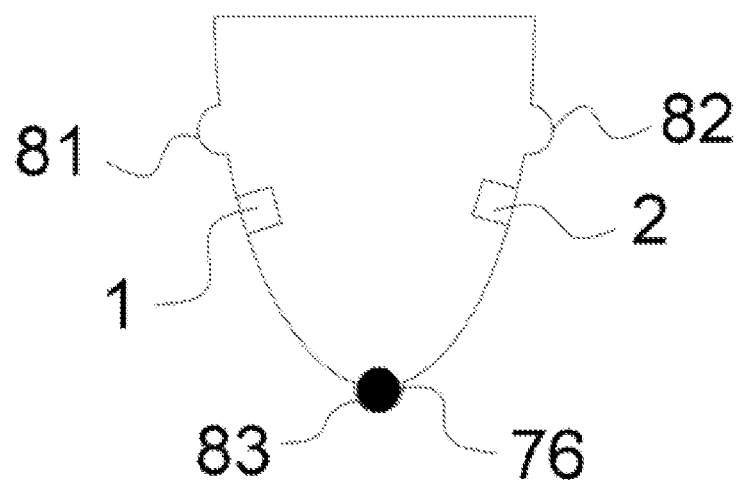
FIGS. 3a to 3c are conceptual views each showing the operating state of a reed switch in FIG. 1 according to an angle change.
Figure 3B:
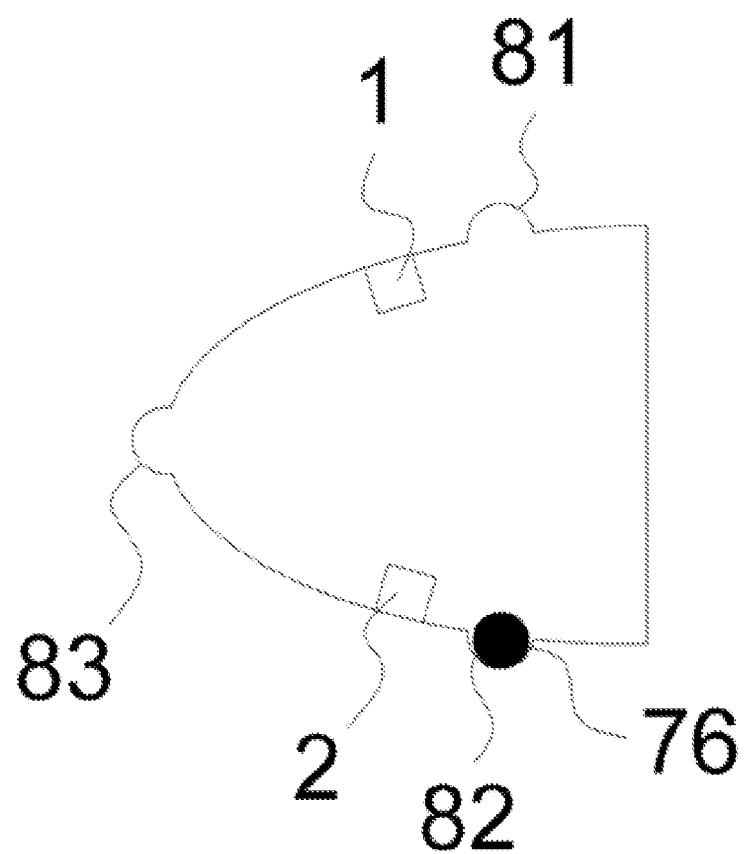
Figure 3C:
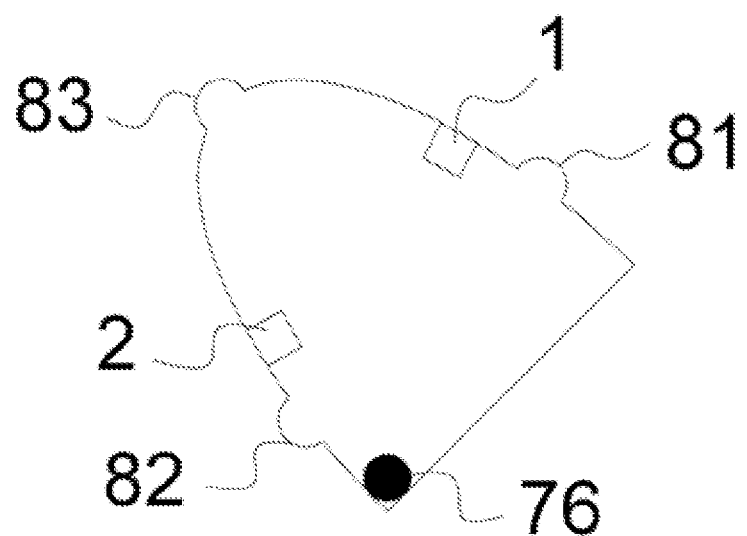

Among the reed switch grooves 81, 82 and 83 formed in the above manner, the mercury 76 is brought into contact with the reed switch groove 83 when the milk bottle holder 100 (i.e., the body case 10) stands vertically as shown in FIG. 3a and brought into contact with the reed switch groove 81 or the reed switch groove 82 when the milk bottle holder 100 lies horizontally as shown in FIG. 3b. In this state, when a parent tilts the milk bottle holder 100 to feed an infant with milk, the mercury 76 is inclined at a predetermined angle and separated away from the reed switch grooves 81, 82 and 83 as shown in FIG. 3c, thus not restricting the power unit 72.

As such, when the rotation of the mobile is not restricted by the power unit 72, and the motor 60 receives power to rotate the mobile 30 and the sound source generator 92 operates to generate a melody in a state where the milk bottle holder 100 is inclined. The reed switch 70 may be provided between a piezoelectric element and the power unit 72 or between the power unit 72, the motor 60, and the sound source generator 92. Although not shown, a contact switch for charging a charger using a piezoelectric element or external power and an on/off switch for manually controlling an on/off operation of the power unit may be provided.

The power unit 72 generates power by means of a piezoelectric element (not shown) in which viruses with proteins are stacked on the surface. The piezoelectric element is provided between the milk bottle 50 and the discoloration case 40 or between the discoloration case 40 and the mobile case 20 to generate electric power.

The currently used piezoelectric elements contain substances harmful to humans such as lead or zirconium, and the manufacturing process thereof is complex. On the contrary, viruses including M13 viruses are harmless to humans. The M13 virus has protein strands coiled helically on the surface thereof, and when these helical protein strands are pushed or twisted, both ends are charged with positive (+) electricity and negative (−) electricity, respectively, thus generating current.

M13 viruses are stacked on the surface of a virus piezoelectric element, and electrodes of gold (Au), for example, are connected to the top and bottom thereof to maximize the efficiency of the virus piezoelectric element and the electric power generation. Viruses have self assembly capability, and thus when a film is immersed in a solution containing viruses, the rod-shaped viruses are evenly distributed even without applying a force from the outside. Therefore, the piezoelectric element is produced by stacking viruses in the above manner.

As such, when the power unit 72 is configured as the virus piezoelectric element, electric power is generated by the weight of liquid milk, resulting in a reduction in electric power and allowing semi-permanent use.

Next, the operation of the multifunctional milk bottle holder according to the present invention will be described with reference to FIGS. 1 to 3c.

The multifunctional milk bottle holder 100 of the present invention is used in a manner that the discoloration case 40 is inserted into the groove 21 of the mobile case 20 installed on the upper side of the body case 10 and then the milk bottle 50 is inserted into the groove 44 of the discoloration case 40. At this time, when the milk contained in the milk bottle 50 is too hot, the color of the doze test paper 42 coated on the surface of the discoloration case 40 is changed by the temperature change, allowing a parent to easily check the temperature of the milk from the outside.

Then, when the body case 10 is inclined to use the milk bottle holder 100 into which the milk bottle 50 is inserted, a specific melody is generated and, at the same time, the mobile 30 installed in the sidewall space 26 between the inner and outer pipes 22 and 24 is rotated. At this time, when the milk bottle holder 100 stands vertically or lies horizontally, the mercury 76 is brought into contact with one of the reed switch grooves 81, 82 and 83 connected to the power unit 72, thus restricting the supply of electric power to the operating case 110 and the sound source generator 92. As a result, the generation of the melody and the rotation of the mobile are restricted, and only when an infant tilts the milk bottle holder 100 to drink milk, the generation of the melody and the rotation of the mobile are selectively operated.

Specifically, as shown in FIG.

when the milk bottle holder 100 stands vertically or lies horizontally, the mercury 76 is brought into contact with one of the reed switch grooves 81, 82 and 83 to restrict the power unit 72, which in turn restricts the rotation of the mobile.

Meanwhile, when a parent tilts the milk bottle holder 100 to feed an infant with milk, the mercury 76 is inclined at a predetermined angle as shown in FIG. 3c and, at this time, separated from the reed switch grooves 81, 82 and 83, and thus the power unit 72 is operated to allow the rotation of the motor 60, which in turn allows the generation of the melody and the rotation of the mobile, thus allowing the infant to drink milk with interest.

Moreover, as shown in FIG. 3b, even when the milk bottle holder 100 lies completely horizontally, the mercury 76 passing through the barrier walls 1 and 2 is brought into contact with one of the reed switch grooves 81 and 82 to shut off the supply of electric power to the power unit 72, which in turn restricts the rotation of the motor 60, thus restricting the generation of the melody and the rotation of the mobile.

As such, the mobile is operated and the music is generated by the correlation between the mercury and the reed switch grooves, and thus the mobile operation and the music generation are automatically determined by the angle of the milk bottle holder with respect to the ground without having to additionally operating the milk bottle holder.

It has been described that the doze test paper 42, rotary plate 32, the mobile case 20, the reed switch grooves 81, 82 and 83, the motor 60, etc. are provided in the multifunctional milk bottle holder 100 according to the embodiment of the present invention such that the manager can easily recognize the milk feeding to the infant, the types of melodies can be variously changed by the addition of a music card, which allows the manager to be convenient to use, to the basic idea of the present invention. That is, the melody card can be operated in a detachable manner, and to this end, a card slot is provided so as to generate music suitable for the age of the infant by the replacement of the music card. Moreover, it is possible to add a music chip, for example, as a component operated by the power of the motor or the current obtained by the virus piezoelectric element mounted in the multifunctional milk bottle holder 100.

The invention has been described with reference to the specific embodiments, but these embodiments are merely exemplary and the invention is not limited to the above-described embodiments. Moreover, it will be appreciated by those skilled in the art that various modifications and equivalent embodiments may be made in these embodiments without departing from the principles and spirit of the invention. Therefore, the scope claimed in the present invention is not defined within the scope of the detailed description, but will be defined by the appended claims and their technical spirit.

The invention claimed is:

1. A multifunctional milk bottle holder comprising:
    a body case having a space formed therein and supporting a milk bottle;
    a mobile case provided with a groove formed in the upper center of the body case to accommodate the milk bottle and formed with a dual pipe structure including an inner pipe and an outer pipe, wherein a mobile is installed in a sidewall space between the inner and outer pipes and a rotary plate is provided on a bottom space between the inner and outer pipes;
    a discoloration case inserted into the groove of the mobile case and including a doze test paper which adheres to the outer surface of the milk bottle and is discolored by a change in temperature of the milk bottle; and
    an operating case located at the inner bottom of the body case,
    wherein the operating case comprises a motor connected to the rotary plate via a shaft to rotate the rotary plate, a power unit for providing rotary power to the motor, and a switch which is formed in a V shape or a U shape that is closed and that comprises a first switch groove and a second switch groove which are formed on both sides of the switch, a third switch groove provided at the bottom of the switch, and a mercury drop located within the switch, the switch controlling an on-or-off operation of the power unit by a correlation between the mercury drop and any of the first, second, and third switch grooves.

2. The multifunctional milk bottle holder of claim 1, wherein the switch comprises a first barrier wall provided between the first switch groove and the third switch groove and a second barrier wall provided between the second switch groove and the third switch groove.

3. The multifunctional milk bottle holder of claim 1, further comprising a piezoelectric element provided between the milk bottle and the discoloration case or between the discoloration case and the mobile case and having viruses with helical proteins stacked on the surface of the piezoelectric element, the piezoelectric element being electrically connected to the power unit.

* * * * *